United States Patent [19]

Wright

[11] Patent Number: 4,472,160
[45] Date of Patent: Sep. 18, 1984

[54] HUB RETENTION DEVICE

[75] Inventor: John Wright, Columbia, Md.

[73] Assignee: Koppers company, Inc., Pittsburgh, Pa.

[21] Appl. No.: 414,016

[22] Filed: Sep. 2, 1982

[51] Int. Cl.$^3$ .............................................. F16D 3/18
[52] U.S. Cl. .................................. 464/156; 464/158; 464/182
[58] Field of Search ................. 403/261, 326, DIG. 6; 464/154, 156, 158, 159, 182

[56] References Cited

U.S. PATENT DOCUMENTS

| 2,893,222 | 7/1959 | Albedyhl et al. | 464/156 |
|---|---|---|---|
| 3,396,554 | 8/1968 | Westercamp | 464/182 X |
| 3,673,814 | 7/1972 | Carman | 464/156 |
| 4,037,430 | 7/1977 | Wright | 464/158 |
| 4,274,827 | 6/1981 | Catsburg | 464/156 X |
| 4,288,172 | 9/1981 | Livesay et al. | 403/326 X |
| 4,411,314 | 10/1983 | Shearhart | 403/326 X |

FOREIGN PATENT DOCUMENTS 1030268  5/1958  Fed. Rep. of Germany ...... 464/182

Primary Examiner—John Petrakes
Assistant Examiner—Daniel P. Stodola
Attorney, Agent, or Firm—Thomas L. Sivak; Herbert J. Zeh, Jr.

[57] ABSTRACT

An improved hub retention device for retaining the coupling hub in proper position on the shaft of a spindle coupling when the roll ends are removed from the coupling sleeve. The hub retention device is comprised of a split-ring member fitted in a circumferential groove formed on the coupling shaft and a continuous ring member shrunken over the split-ring member.

2 Claims, 1 Drawing Figure

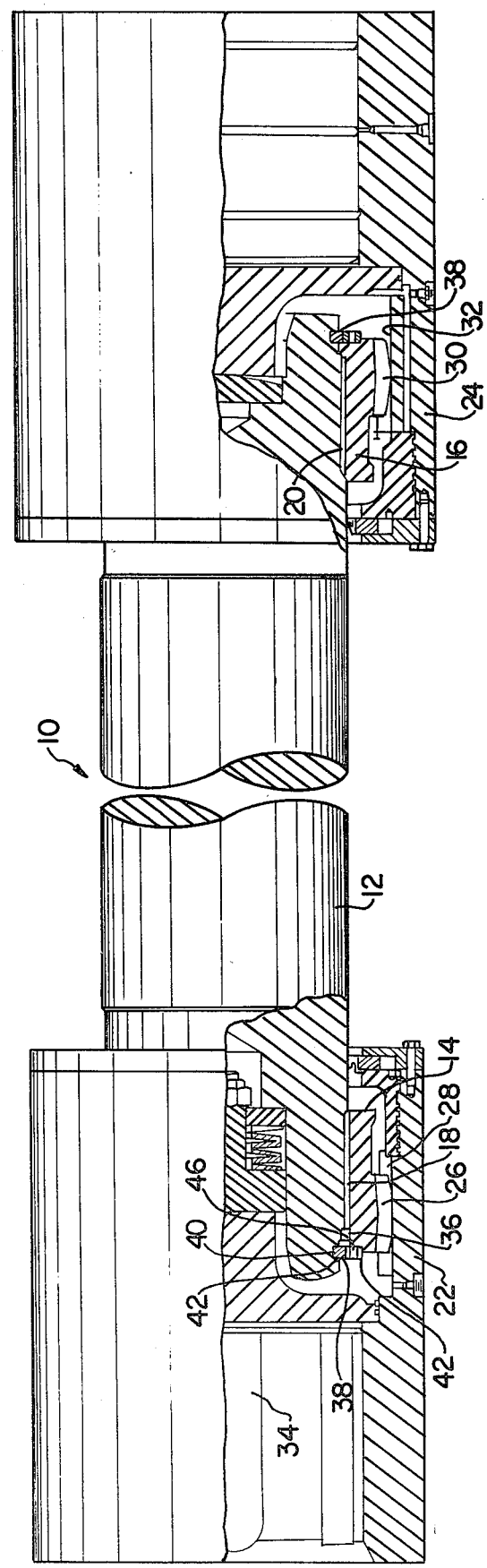

HUB RETENTION DEVICE

BACKGROUND OF THE INVENTION

1. Field of the Invention

This invention relates to a hub retainment device and, more particularly, to a device to secure the hub on the coupling shaft and to prevent the hub being pulled off the shaft when the roll spade is removed from the coupling sleeve.

2. Brief Description of the Prior Art

Gear-type spindle couplings for connecting the spade ends of the rolls of a rolling mill to a prime mover or gear are old and well known in the art. In the usual type of spindle coupling, the sleeve at an end connects to the prime mover and the sleeve at the other end to the spade end of the roll. Each sleeve is drivingly connected by means of gear teeth to hubs which are fixed on opposite ends of the spindle shaft by means of splines or the like. When it becomes necessary to repair or replace the rolls of the rolling mill, the roll ends are withdrawn from the sleeve. Because of the close tolerances necessary to transmit torque between the sleeve and roll end, withdrawal of the roll ends often causes the sleeve to move with the roll as it is being withdrawn. Movement of the sleeve causes it to butt the hub urging it to move off of the coupling shaft. To prevent the hub from sliding, prior art couplings have used a retaining ring which is bolted to the shaft. While such an arrangement ordinarily will prevent movement of the hub, it has been found on occasion that the bolts will shear allowing them to fall into an area where the gear teeth of the sleeve and hub mesh. If the bolts enter this area, severe wear and damage to the teeth takes place and the entire coupling must be disassembled to remove the bolt heads. This increases the time the mill is shut down and adds to the cost of maintenance.

SUMMARY OF THE INVENTION

The present invention overcomes the foregoing problems of the prior art by providing a hub retention means comprised of a split-ring member adapted to be received by a circumferential groove on the coupling shaft. A continuous ring member is shrunk over the split ring member to form the hub retention means. The continuous ring member includes a plurality of tapped holes to facilitate removal of it from the split-ring.

BRIEF DESCRIPTION OF THE DRAWING

FIG. 1 is a side view, partially in section, of a spindle coupling incorporating the hub retention means of the present invention.

DESCRIPTION OF THE PREFERRED EMBODIMENT

The construction and operation of spindle couplings used to connect the rolls of a rolling mill to prime movers are fully described in numerous U.S. Patents including U.S. Pat. Nos. 4,037,430 and 4,137,999. This description is incorporated herein by reference and will only be repeated when necessary for one skilled in the art to understand the present invention.

Referring to FIG. 1, a spindle coupling, generally designated 10, is comprised of a shaft 12 to which hubs 14 and 16 are mounted through splines 18 and 20. Sleeves 22 and 24 drivingly co-act with hubs 14 and 16 through gear teeth 26, 28, 30 and 32. Sleeve 22 is adapted to receive roll end 34 and sleeve 24 is adapted to receive the shaft of a prime mover such as a motor or gear, not shown. The hub retention means of the present invention will be described on the roll end of the coupling; it being understood that an exact hub retention is on the driving end as shown in FIG. 1.

Hub 14 is held in position on shaft 12 by means of shoulder 36 in combination with the hub retention means 38. Hub retention means 38 is comprised of a split-ring 40 which is adapted to be received in circumferential groove 42 in shaft 12 and a continuous ring 44 which is heated and then shrunk over split-ring 40 to exert a compressive force and prevent radial expansion of the split ring 40. Continuous ring 44 has a plurality of tapped holes 46, in the preferred embodiment four equally spaced around the circumference, in which bolts can be inserted to jack continuous ring 44 off split ring 40. It can be seen that rings 40 and 44 retain hub 14 and will prevent movement when roll end 34 is withdrawn from sleeve 22 without the problem of having bolts which can shear because of the pressure exerted by the sleeve.

While I have described a certain preferred embodiment of my invention, it will be understood it may otherwise be embodied within the scope of the following claims.

What is claimed:

1. In a gear type coupling comprised of a coupling shaft having a hub mounted thereon, said hub having outwardly extending gear teeth, and a sleeve having inwardly extending gear teeth, said sleeve adapted to drivingly co-act with said hub through said gear teeth, a hub retention means for maintaining said hub of said coupling in proper position on said coupling shaft, said hub retention means comprising a split ring member fitted in a circumferential groove on said coupling shaft and a continuous ring member shrunk fitted over the outer circumference of said split ring member to exert a compressive force thereon to prevent radial expansion of said split ring member thereby maintaining said split ring member in said groove in said coupling shaft and in abutment with said hub to prevent movement of said hub on said coupling shaft.

2. The hub retention means of claim 1 wherein said continuous ring member has at least one axially tapped hole through the body thereof.

* * * * *